US012494007B2

(12) United States Patent
Jin et al.

(10) Patent No.: US 12,494,007 B2
(45) Date of Patent: Dec. 9, 2025

(54) IMAGE PROCESSING METHOD, APPARATUS, AND READABLE STORAGE MEDIUM FOR PERFORMING FEATURE ANALYSIS ON AT LEAST ONE IMAGE MATERIAL TO ACQUIRE A CONTENT FEATURE SET

(71) Applicant: Lemon Inc., Grand Cayman (KY)

(72) Inventors: Xiaojie Jin, Los Angeles, CA (US); Yan Wang, Beijing (CN)

( * ) Notice: Subject to any disclaimer, the term of this patent is extended or adjusted under 35 U.S.C. 154(b) by 159 days.

(21) Appl. No.: 18/570,533

(22) PCT Filed: May 9, 2022

(86) PCT No.: PCT/SG2022/050286
§ 371 (c)(1),
(2) Date: Dec. 14, 2023

(87) PCT Pub. No.: WO2023/277790
PCT Pub. Date: Jan. 5, 2023

(65) Prior Publication Data
US 2024/0290016 A1 Aug. 29, 2024

(30) Foreign Application Priority Data

Jun. 30, 2021 (CN) .......................... 202110738116.5

(51) Int. Cl.
*G06T 11/60* (2006.01)
*G06V 10/44* (2022.01)
(Continued)

(52) U.S. Cl.
CPC .............. *G06T 11/60* (2013.01); *G06V 10/44* (2022.01); *G06V 10/462* (2022.01); *G06V 40/168* (2022.01)

(58) Field of Classification Search
CPC ...... G06T 11/60; G06V 10/44; G06V 10/462; G06V 40/168; G06V 10/74; G06V 10/764;
(Continued)

(56) References Cited

U.S. PATENT DOCUMENTS

2015/0026578 A1\* 1/2015 Rav-Acha ........... G06F 16/4393
715/723
2017/0147906 A1\* 5/2017 Shekhar ................. G06V 20/62
(Continued)

FOREIGN PATENT DOCUMENTS

CN 109819179 A 5/2019
CN 110139159 A 8/2019
(Continued)

*Primary Examiner* — Maurice L. Mcdowell, Jr.
(74) *Attorney, Agent, or Firm* — Alleman Hall & Tuttle LLP

(57) ABSTRACT

The present disclosure relates to an image processing method, an apparatus, and a readable storage medium. The image processing method may obtain a multimedia resource with content continuity by: performing feature analysis on at least one image material to acquire a content feature set, where each content feature included in the content feature set is used for representing a content expressed by the image material in a corresponding particular dimension; next, acquiring an editing strategy of the at least one image material based on the content feature set and in accordance with a mapping relationship between different content features in the particular dimension and different operation modes of different editing operation types; and synthesizing the at least one image material according to each target editing operation mode included in the editing strategy.

20 Claims, 6 Drawing Sheets

(51) Int. Cl.
 *G06V 10/46* (2022.01)
 *G06V 40/16* (2022.01)
(58) Field of Classification Search
 CPC ...... G06V 10/774; G06V 40/10; G06V 40/16;
 H04N 21/44; H04N 21/845; H04N 5/262;
 G06F 16/483; G06F 16/683; G06N 20/00
 See application file for complete search history.

(56) References Cited

U.S. PATENT DOCUMENTS

2020/0090701 A1* 3/2020 Xu ..................... H04N 21/2743
2021/0264952 A1* 8/2021 Zhu .......................... G06N 5/01

FOREIGN PATENT DOCUMENTS

| CN | 111243632 A | 6/2020 | |
|---|---|---|---|
| CN | 111866404 A | 10/2020 | |
| CN | 112689200 A | 4/2021 | |
| CN | 112988671 A | 6/2021 | |
| WO | WO-2022103397 A1 * | 5/2022 | ............. G11B 27/28 |

* cited by examiner

IMAGE PROCESSING METHOD, APPARATUS, AND READABLE STORAGE MEDIUM FOR PERFORMING FEATURE ANALYSIS ON AT LEAST ONE IMAGE MATERIAL TO ACQUIRE A CONTENT FEATURE SET

CROSS-REFERENCE TO RELATED APPLICATION

This application is a national stage of the International application PCT/SG2022/050286on May 9, 2022. This International application claims priority to Chinese Patent Application No. 202110738116.5, filed on Jun. 30, 2021.All of these applications are hereby incorporated by reference in their entireties.

TECHNICAL FIELD

The present disclosure relates to the technical field of image processing, and in particular, to an image processing method, an apparatus, and a readable storage medium.

BACKGROUND

At present, people can use electronic devices with a capturing function to capture various image materials. Sometimes people may also use processing tools to perform post processing (e.g., adding a special effect, uniting, adding a background music) on such image materials to obtain more interesting videos. To facilitate video creation by people, some processing tools may provide editing templates, and users can select an editing template and select their favorite image materials to obtain a synthesized video.

However, the video synthesized by the editing template may have a poor effect.

SUMMARY

In order to solve the above-mentioned technical problems or at least partially solve the above-mentioned technical problems, the present disclosure provides an image processing method, an apparatus, and a readable storage medium.

In a first aspect, embodiments of the present disclosure provide an image processing method comprising:
  acquiring at least one image material;
  performing feature analysis on the at least one image material to acquire a content feature set, in which the content feature set comprises a content feature in at least one particular dimension, and the content feature is used for representing a content expressed by an image material in a corresponding particular dimension;
  acquiring an editing strategy of the at least one image material based on the content feature set, in which the editing strategy comprises one or more target editing operation modes corresponding to one or more editing operation types, respectively;
  and editing the at least one image material into a multimedia resource according to the one or more target editing operation modes.

In an optional example, acquiring an editing strategy of the at least one image material based on the content feature set, comprises:
  for a first editing operation type, acquiring a target editing operation mode corresponding to the first editing operation type based on a content feature in a first target dimension and a first preset mapping relationship, in which the content feature in the first target dimension belongs to the content feature set;
  and the first preset mapping relationship comprises a mapping relationship between different content features corresponding to the first target dimension and different operation modes comprised in the first editing operation type.

In an optional example, acquiring an editing strategy of the at least one image material based on the content feature set, comprises:
  acquiring a music content feature corresponding to a first target background music, in which the first target background music has an association relationship with a second target background music, and the second target background music is used to be edited into the multimedia resource together with the at least one image material;
  and for a second editing operation type, acquiring a target editing operation mode corresponding to the second editing operation type based on a content feature in a second target dimension comprised in the content feature set, the music content feature corresponding to the first target background music, and a second preset mapping relationship;
  and the second preset mapping relationship comprises a mapping relationship between different content features corresponding to the second target dimension, different music content features, and different operation modes comprised in the second editing operation type.

In an optional example, the first target background music belongs to at least one piece of candidate background music, and the at least one piece of candidate background music is determined based on a content feature in a third target dimension comprised in the content feature set; or the first target background music is determined based on a music selection operation input by a user.

In an optional example, editing the at least one image material into a multimedia resource according to the one or more target editing operation modes, comprises:
  editing the at least one image material and the second target background music together into the multimedia resource according to the one or more target editing operation modes;
  and a music content feature of the second target background music and the music content feature of the first target background music meet a preset similarity.

In an optional example, performing feature analysis on the at least one image material to acquire a content feature set, comprises:
  performing feature analysis on a first image material comprised in the at least one image material to obtain a first content feature set corresponding to the first image material;
  and acquiring an editing strategy of the at least one image material based on the content feature set, comprises:
  for the first image material comprised in the at least one image material, acquiring the editing strategy of the first image material based on the first content feature set corresponding to the first image material, in which the editing strategy of the first image material is used for indicating a target editing operation mode performed for the first image material.

In an optional example, performing feature analysis on the at least one image material to acquire a content feature set, comprises:

grouping at least two image materials to obtain at least one image material group, in which the at least one image material group comprises a first image material group, and the first image material group comprises two or more image materials;

and performing feature analysis on the first image material group to obtain a second content feature set corresponding to the first image material group;

acquiring an editing strategy of the at least one image material based on the content feature set, comprises:

for the first image material group comprised in the at least one image material group, acquiring an editing strategy of the first image material group based on the second content feature set corresponding to the first image material group, in which the editing strategy of the first image material group is used for indicating a target editing operation mode performed for each image material comprised in the first image material group.

In an optional example, the feature analysis comprises:

one or more of salient feature analysis, image scene feature analysis, human face feature analysis, image theme feature analysis, and image emotion feature analysis.

In an optional example, the at least one particular dimension comprises:

one or more of an image scene dimension, an image theme dimension, an image emotion dimension, an image character relationship dimension, an image salient feature dimension, and an image attribute dimension.

In a second aspect, the embodiments of the present disclosure provide an image processing apparatus, comprising:

an acquiring module, configured to acquire at least one image material;

a feature analysis module, configured to perform feature analysis on the at least one image material to acquire a content feature set, in which the content feature set comprises a content feature in at least one particular dimension, and the content feature is used for representing a content expressed by an image material in a corresponding dimension;

an editing strategy determination module, configured to acquire an editing strategy of the at least one image material based on the content feature set, in which the editing strategy comprises one or more target editing operation modes corresponding to one or more editing operation types, respectively;

and a synthesis module, configured to edit the at least one image material into a multimedia resource according to the one or more target editing operation modes.

In a third aspect, the embodiments of the present disclosure provide an electronic device comprising a memory, a processor, and a computer program, the memory is configured to store the computer program;

and the processor is configured to execute the computer program to implement the image processing method according to any one of the first aspect.

In a fourth aspect, the embodiments of the present disclosure provide a readable storage medium comprising a computer program;

the computer program, when executed by at least one processor of an electronic device, implements the image processing method according to any one of the first aspect.

In a fifth aspect, the embodiments of the present disclosure provide a program product comprising a computer program, the computer program is stored in a readable storage medium; at least one processor of an electronic device reads the computer program from the readable storage medium; and the at least one processor executes the computer program to cause the electronic device to implement the image processing method according to any one of the first aspect.

The embodiments of the present disclosure provide an image processing method, an apparatus, and a readable storage medium. The image processing method may obtain a multimedia resource with content continuity by: performing feature analysis on at least one image material to acquire a content feature set, where each content feature included in the content feature set is used for representing a content expressed by the image material in a corresponding particular dimension; next, acquiring an editing strategy of the at least one image material based on the content feature set and in accordance with a mapping relationship between different content features in the particular dimension and different operation modes of different editing operation types; and synthesizing the at least one image material according to each target editing operation mode included in the editing strategy.

The image processing method provided by the embodiments of the present disclosure can specifically determine the target editing operation mode better matching the content expressed by the image material according to features of the image material, thereby further highlighting the storytelling of the obtained multimedia resource. In addition, by using the image processing method provided by the embodiments of the present disclosure, the problem of serious homogenization caused by synthesizing a multimedia resource using an editing template can be solved.

BRIEF DESCRIPTION OF DRAWINGS

The drawings herein are incorporated into and form a part of the specification, illustrate the embodiments consistent with the present disclosure, and are used in conjunction with the specification to explain the principles of the present disclosure.

In order to more clearly illustrate the technical solutions in the embodiments of the present disclosure or in prior art, the drawings to be used in the description of the embodiments or prior art will be briefly described below, and it will be obvious to those ordinarily skilled in the art that other drawings can be obtained on the basis of these drawings without inventive work.

DETAILED DESCRIPTION

Figure 1:
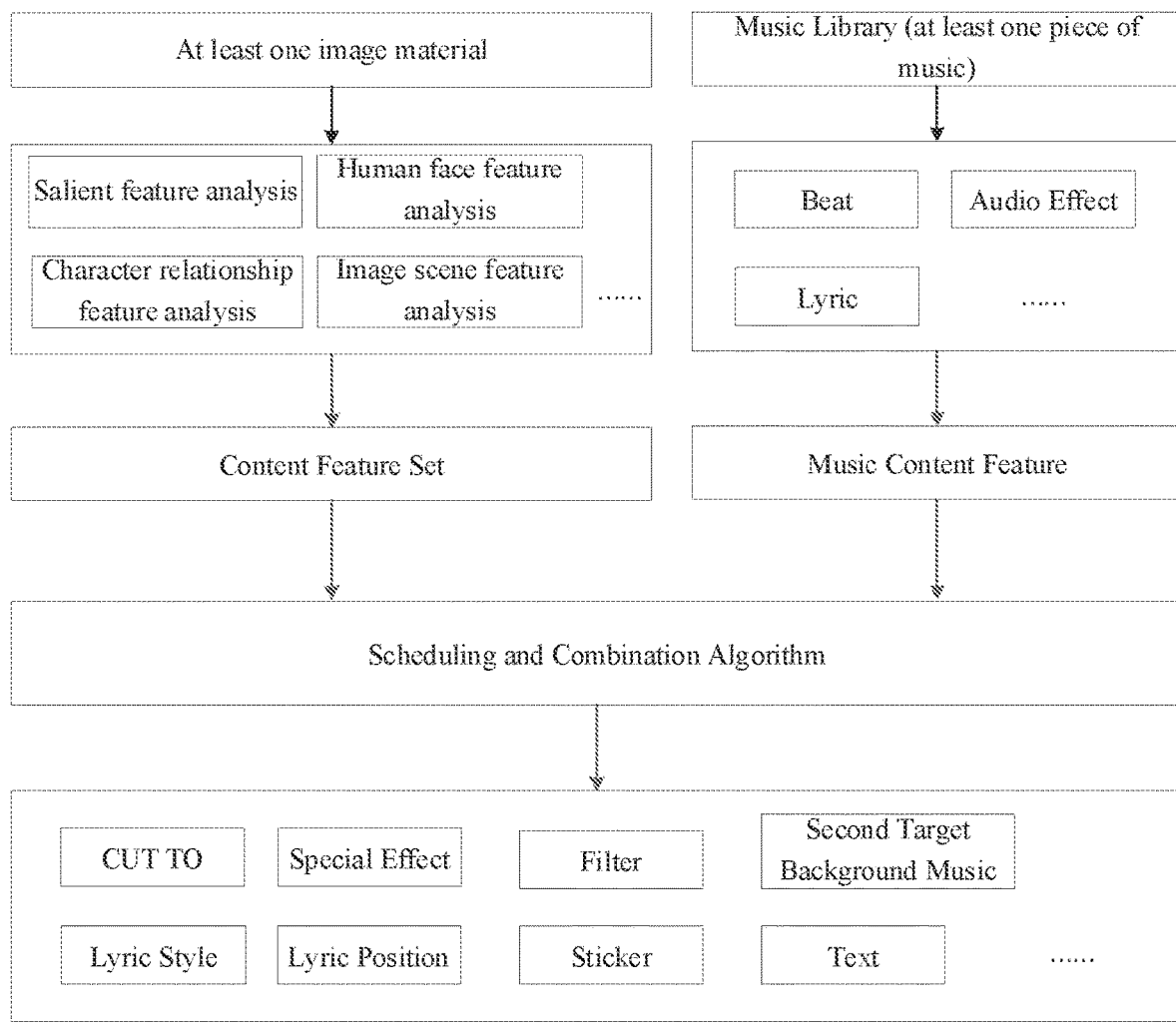
FIG. 1 is a flowchart of an image processing method provided by an embodiment of the present disclosure.

In order to understand the above objects, features and advantages of the present disclosure more clearly, the solutions of the present disclosure will be further described below. It should be noted that, in case of no conflict, the features in one embodiment or in different embodiments can be combined.

Many specific details are set forth in the following description to fully understand the present disclosure, but the present disclosure can also be implemented in other ways different from those described here; obviously, the embodiments in the specification are a part but not all of the embodiments of the present disclosure.

To facilitate video creation by people, some processing tools may provide editing templates, and users can select an editing template and select their favorite image materials to obtain a synthesized video. Because an editing operation mode used by an editing template is typically fixed, any image material uploaded by a user may be edited by the fixed editing operation mode used by the editing template, and it is possible that the fixed editing operation mode used by the editing template does not match a content expressed by the image material. This may further lead to poor effect of a synthesized multimedia resource. As a result, the content expressed by the image material cannot be well expressed.

In addition, due to the fixed editing operation mode used by the editing template, synthesizing multimedia resources by the editing template may lead to serious homogenization, which may reduce the user's enthusiasm of video creation.

In view of the above-mentioned problems, the embodiments of the present disclosure provide an image processing method, an apparatus, an electronic device, a readable storage medium, and a computer program. The core idea of the image processing method is to analyze, by a particular means, contents expressed by image materials in a particular dimension to obtain content features of the images in each particular dimension. An editing strategy of the image materials is then determined based on the content features of the image materials in each particular dimension and in accordance with a mapping relationship between different content features in the particular dimension and various editing operation modes of different editing operation types, thus guaranteeing good content continuity (storytelling) of a multimedia resource obtained by synthesizing the image materials according to each target editing operation mode included in the editing strategy.

From the perspective of the image material, the image processing method provided by the embodiments of the present disclosure can specifically determine the target editing operation mode better matching the content expressed by the image material according to features of the image material, thereby highlighting the storytelling of the synthesized multimedia resource.

The image processing method provided by the embodiments of the present disclosure may be performed by the image processing apparatus provided by the embodiments of the present disclosure, and the image processing apparatus may be implemented by any software and/or hardware. Exemplarily, the image processing apparatus is an Internet of Things (IOT) device, such as a tablet computer, a mobile phone (e.g., a foldable screen mobile phone, a large screen mobile phone), a wearable device, a vehicle-mounted device, an augmented reality (AR)/virtual reality (VR) device, a laptop computer, an ultra-mobile personal computer (UMPC), a netbook, a personal digital assistant (PDA), a smart television, a smart screen, a high-definition television, a 4K television, a smart speaker, and a smart projector. The embodiments of the present disclosure have no any limitation on the specific type of the image processing apparatus.

The embodiments of the present disclosure have no any limitation on the type of an operating system of the image processing apparatus. For example, Android system, Linux system, Windows system, iOS system, and the like may be used.

The image processing apparatus may also be implemented by software. For example, the image processing apparatus may be a program product.

The image processing method provided by the embodiments of the present disclosure will be described in detail below by several embodiments. In the following embodiments, the description is made by taking the case where a performing main body is the image processing apparatus as an example.

FIG. 1 is a framework of an image processing method provided by an embodiment of the present disclosure. Specifically, as shown in FIG. 1, the image processing method provided by the embodiments of the present disclosure includes performing feature analysis on image materials. For example, one or more of image scene feature analysis, human face feature analysis, image salient feature analysis, image theme feature analysis, image emotion feature analysis, and the like may be performed to acquire a content feature set of the image materials.

If the image materials do not need an incidental music, an editing strategy of the image materials may be determined by a scheduling and combination algorithm based on content features in the content feature set; and the image materials are synthesized according to the editing strategy.

If the image materials need an incidental music (i.e., a background music), a background music to be used and an editing strategy of the image materials may be determined by a scheduling and combination algorithm based on music content features of each piece of music from a music library in different music dimensions and the content feature set of the image materials; and the image materials and the background music are synthesized according to the editing strategy of the image materials.

The scheduling and combination algorithms used respectively in the two cases of the image materials needing the incidental music and needing no incidental music may be different.

Figure 2:
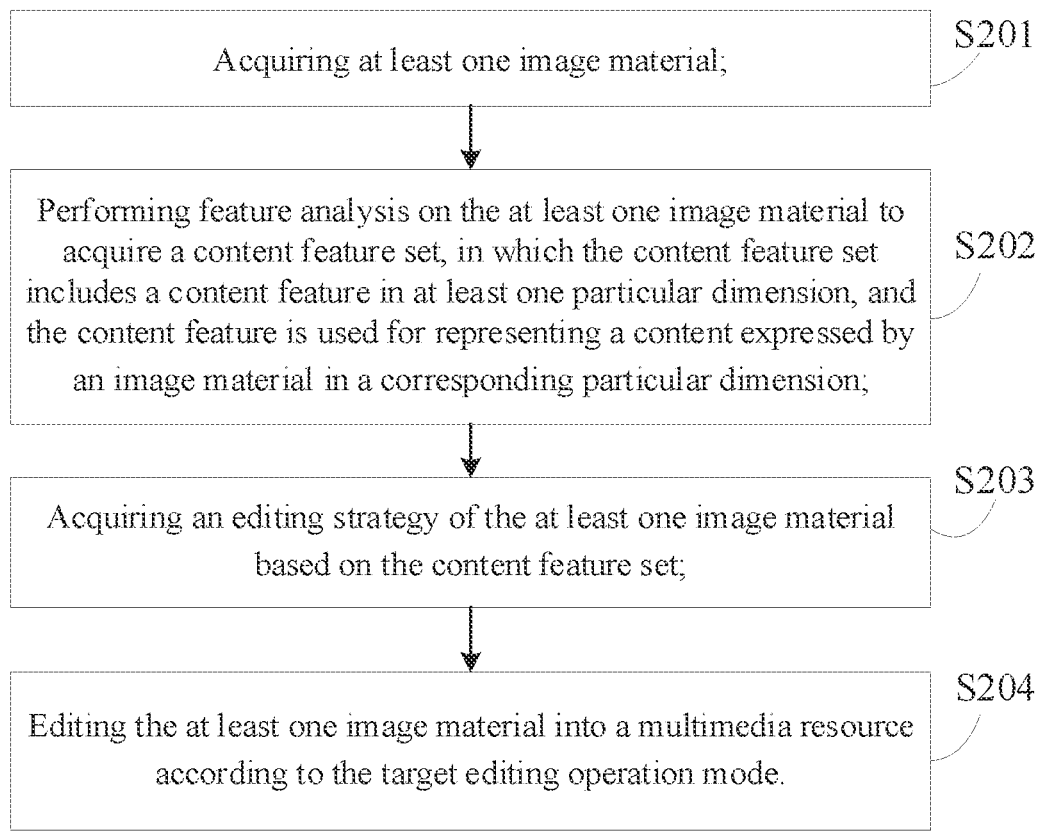
FIG. 2 is a flowchart of an image processing method provided by an embodiment of the present disclosure.
Figure 4:
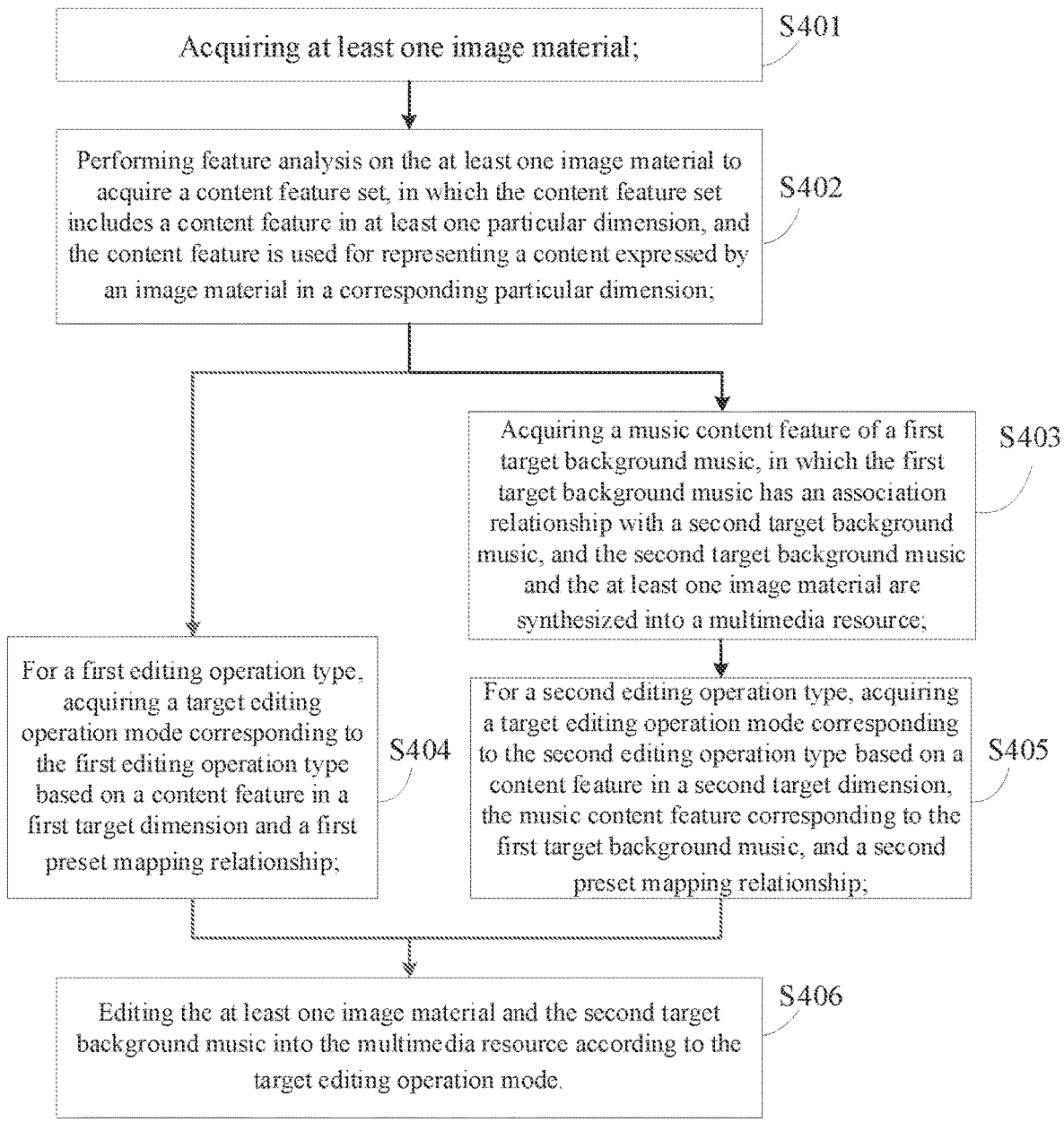
FIG. 4 is a flowchart of an image processing method provided by another embodiment of the present disclosure.

On the basis of the embodiment shown in FIG. 1, the two scenarios of the image materials needing an incidental music and needing no incidental music are described below by embodiments shown in FIG. 2 and FIG. 4, respectively. The embodiment shown in FIG. 2 shows the case of the image materials needing no incidental music. The embodiment shown in FIG. 4 shows the case of the image materials needing the incidental music.

FIG. 2 is a flowchart of an image processing method provided by an embodiment of the present disclosure. As shown in FIG. 2, the image processing method in this embodiment include the following steps.

S201: acquiring at least one image material.

The image material may be a photo, an image, a video clip, and the like. The embodiments of the present disclosure have no limitations on parameters such as the storage format, duration (when the image material is a video clip), and quantity of the image material.

When there are a plurality of image materials, one case is that the plurality of image materials may be of a same type. For example, the plurality of image materials may be all photos or images or video clips. In another case, the plurality of image materials may also be of different types. For example, the plurality of image materials may include a photo and a video clip or may include a photo, an image, and a video clip.

In an optional example, the image processing apparatus may provide a material display interface, and the material display page may display various image materials and some relevant information (e.g., video duration) of the image materials as thumbnails. The image processing apparatus may acquire a selection instruction input by a user on the material display interface to acquire the at least one image material.

In practice, the material display page may display materials as thumbnails in time order regardless of type. Alternatively, the material display page may show a plurality of types divided by photo, image, video, and the like, and each type corresponds to a display entry label. Based on an operation of a user on the display entry label, the image processing apparatus displays materials of the corresponding type as thumbnails based on the operation of the user on the display entry label. Next, the at least one image material is acquired according to the selection instruction of the user.

In another optional example, the image processing apparatus may capture an image or a video clip according to a capturing instruction input by the user. The captured image or video clip is the image material.

The image processing apparatus may also acquire the at least one image material in other ways. The embodiments of the present disclosure have no limitation on the specific implementation of acquiring the at least one image material by the image processing apparatus.

S202: performing feature analysis on the at least one image material to acquire a content feature set, in which the content feature set includes a content feature in at least one particular dimension, and the content feature is used for representing a content expressed by an image material in a corresponding particular dimension.

Here, the content feature set is introduced first.

The content feature set may include a content feature of the at least one image material in at least one particular dimension. Each content feature is used for representing the content expressed by the image material in the corresponding particular dimension.

The image material may be of several types, such as a photo, an image, and a video clip.

If the image material is a photo or an image, the content feature set may include content features of the photo or the image in these particular dimensions. If the image material is a video clip, the feature analysis may be performed on each video frame in a video frame sequence as an object to acquire content features of the video frame in these particular dimensions. Alternatively, part of video frames may be selected from the video frame sequence, and the feature analysis may be performed on each of the selected video frames as an object to acquire content features of the selected video frame objects in these particular dimensions.

The at least one particular dimension may include but is not limited to one or more of an image scene dimension, an image theme dimension, an image emotion dimension, an image character relationship dimension, an image salient feature dimension, and an image attribute dimension.

Exemplarily, a plurality of different image scenes may be classified in advance. For example, the image scenes may include but are not limited to scene categories such as an indoor scene, an outdoor scene, and a natural scenery/landscape. The indoor scene may be further classified into scene subcategories such as a coffee shop, a gymnasium, a classroom, and a shopping mall. The outdoor scene may also be similarly further classified into scene subcategories such as a playground and a road. The natural scenery/landscape may be further classified into scene subcategories such as a terrestrial landscape, a water area, sky, and plants. Each of the subcategories may be further subdivided. For example, the terrestrial landscape may be further classified into subcategories such as a desert, a snow mountain, a cave, and a grassland. Correspondingly, the content feature in the image scene dimension may include but is not limited to scene category information such as an indoor scene and an outdoor scene.

Exemplarily, a plurality of different image themes may be classified in advance. For example, the image themes may include but are not limited to tourism, shopping, party, festival, and food. Correspondingly, the content feature in the image theme dimension may include but is not limited to theme category information such as tourism, shopping, party, festival, and food.

Exemplarily, a plurality of different image emotions may be classified in advance. For example, the image emotions may include but are not limited to grieved, sad, neutral, positive, and happy. Correspondingly, the content feature in the image emotion dimension may include but is not limited to category information such as grieved, sad, neutral, positive, and happy.

Exemplarily, a plurality of image character relationships may be classified in advance. For example, the image character relationships may include but are not limited to parents, friends, sisters, and brothers. Correspondingly, the content feature in the image character relationship dimension may include but is not limited to character relationship information such as parents, friends, sisters, and brothers.

Exemplarily, the image salient feature is a salient region of the image. The content feature in the image salient feature dimension may include the relevant information of the salient region of the image, for example, information such as the position of the salient region of the image in the image, and the size of the salient region.

Exemplarily, the content feature in the image attribute dimension may include attribute information of the image material, for example, the resolution of the image material, and brightness of the image.

It should be understood that different content features of respective particular dimensions are merely examples and the content features included in respective particular dimensions may be set as needed in practice.

Alternatively, in some particular dimensions, for a single image material, the content features of the image material in a particular dimension may be obtained based on the feature information of the image material in the particular dimension.

For example, in the image emotion dimension, the feature analysis may be performed on each image material to output the content feature of the image material in the image emotion dimension. For another example, in the image theme dimension, the feature analysis may be performed on each image material to output the content feature of the image material in the image theme dimension.

Alternatively, in some particular dimensions, if there are a plurality of image materials, all or part of the image materials may be grouped to acquire at least one image material group, in which the at least one image material group includes two or more image materials. In other words, in the case of a plurality of image material groups, some image material groups may each include only one image material. For the image material group including two or more image materials, the content features of the image material group in the particular dimension may be acquired based on the feature information of the two or more image materials included in the image material group in the particular dimension. In this case, it may also be construed as that the corresponding content feature of each image material included in the image material group in the particular dimension is the same. For the image material group including one image material, actually the corresponding content feature is output for the image material.

For example, in the image character relationship dimension, a plurality of image materials may be grouped according to character identification results in the image materials, and one content feature in the image character relationship dimension is output for each image material group. For another example, in the image theme dimension, a plurality of image materials may be grouped according to a level of similarity of objects included in the image materials, and one content feature in the image theme dimension is output for each image material group.

Alternatively, the feature analysis may be performed on a first image material included in the at least one image material to acquire a first content feature set corresponding to the first image material. The first content feature set includes a content feature of the first image material in the at least one particular dimension.

The first image material may be an image material capable of being analyzed separately in the at least one image material. For example, the at least one image material includes 3 sky photos and 1 character group photo, and the first content feature set may be output separately for the character group photo.

The embodiments the present disclosure have no limitation on the number of the first image materials.

Alternatively, from the perspective of image materials, all or part of image materials of a plurality of image materials may be grouped according to a level of similarity of the image materials to obtain at least one image material group. The at least one image material group includes a first image material group which includes two or more image materials. Next, the feature analysis is performed on the first image material group to obtain a second content feature set corresponding to the first image material group.

For example, the at least one image material includes a plurality of photos of sky captured continuously by a user, and contents expressed by the plurality of photos are close. Therefore, the plurality of photos may be put into one image material group, and when performing the feature analysis, an integral second content feature set may be output for the image material group.

Grouping image materials may also be based on other information of the image materials, e.g., information such as geographical locations and objects in the image materials.

The embodiments the present disclosure have no limitation on the number of the first image material groups.

In practice, whether a content feature or a content feature set is output for a single image material, or one content feature or one content feature set is output for an entire image material group may be flexibly set.

In this step, the content feature set is obtained by performing the feature analysis on the image material. A specific manner of the feature analysis includes but is not limited to one or more of salient feature analysis, image scene feature analysis, human face feature analysis, image theme feature analysis, image scene feature analysis, and image emotion feature analysis.

The feature analysis may be implemented by using the machine learning technology, and a feature analysis result is obtained using a corresponding machine learning model. For example, the image scene feature analysis may be implemented using a scene classification model. The scene classification model is capable of outputting an image scene classification feature of an image material, and the content feature in the image scene dimension may be acquired based on the image scene classification feature.

Next, how the image processing apparatus acquires the content feature set is described.

Exemplarily, first, the feature information of the at least one image material in at least one particular dimension is extracted; next, the feature analysis is performed based on the feature information of the at least one image material in the particular dimensions, and the content feature set is acquired based on a feature analysis result.

In an optional example, the content feature set of the image materials is acquired by the machine learning technology.

Figure 3:
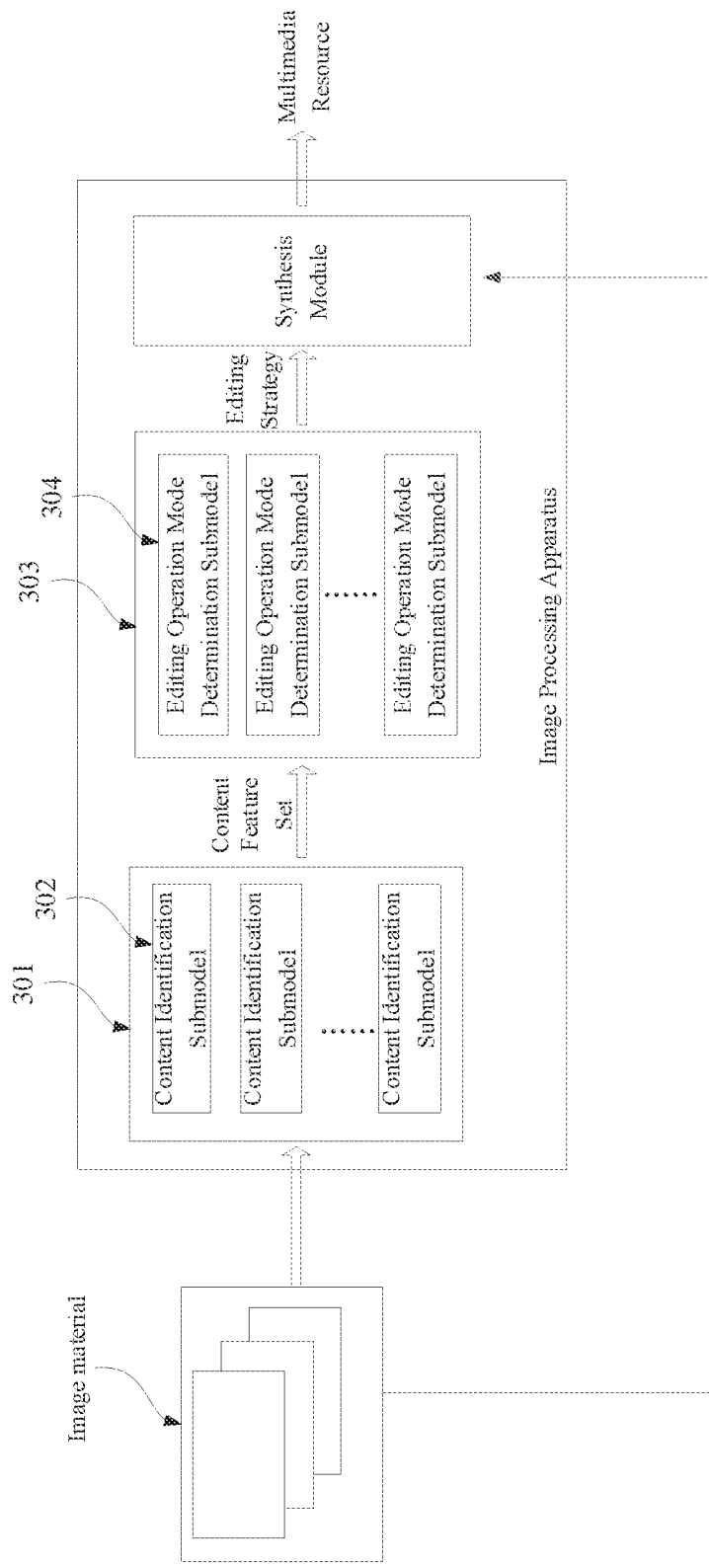
FIG. 3 is an architecture diagram of an image processing apparatus provided by an embodiment of the present disclosure.

FIG. 3 exemplarily illustrates an architecture diagram of implementing the image processing method provided by the present disclosure using a machine learning model. With reference to FIG. 3, a machine learning model 301 for acquiring the content feature set may be deployed in advance in the image processing apparatus. The at least one image material is input to the machine learning model 301 to acquire the content feature set output by the machine learning model 301.

Because it is necessary to acquire the content features of the at least one image material in different particular dimensions in practice, the machine learning model 301 may include content identification submodels 302 corresponding to the different particular dimensions, respectively. The at least one image material is input to the content identification submodels 302 corresponding to the different particular dimensions, respectively, to acquire the content features of the image materials in the corresponding particular dimensions output by the content identification submodels 302.

Some content identification submodels 302 may output the content feature corresponding to each image material. Some content identification submodels 302 may output one content feature for each image material group.

In practice, the feature information in a plurality of different dimensions used by the content identification submodels 302 may have an intersection. For example, the content identification submodel 302 corresponding to the image character relationship dimension may need to utilize the result of the human face feature analysis. If the image material includes a character, the content identification submodel 302 corresponding to the image emotion dimension needs to perform emotion analysis on the image material and accurately determine an image emotion of the image material in combination with the result of the human face feature analysis. In this case, a module performing the human face feature analysis may be connected to the content identification submodel 302 needing to use the result of the human face feature analysis, providing data to the corresponding content identification submodel 302.

In a similar case, in the machine learning model 301, some modules performing the feature analysis may be connected to the content identification submodels needing to use feature analysis results output by the feature analysis modules, providing the feature analysis results to the connected content identification submodels 302.

S203: acquiring an editing strategy of the at least one image material based on the content feature set.

The editing strategy may include one or more target editing operation modes corresponding to one or more editing operation types, respectively. The editing operation types may include but are not limited to one or more of CUT TO, Specific effect, Filter, Animation, Sticker, Text, Image size, Text position, Lyric style, Lyric position, and the like.

Each editing operation type may include a plurality of editing operation modes. For example, the CUT TO (i.e., the editing operation type) may include a plurality of CUT TO subtypes (the CUT TO subtypes may be understood as editing operation subtypes of the editing operation type) such as CUT TO by camera movement, basic CUT TO, and CUT TO by a special effect, and each CUT TO subtype may include one or more CUT TO modes (the CUT TO mode is the editing operation mode). For another example, the filter may include a plurality of filter subtypes such as Landscape, Retro, Food, Fresh, Movie, and Oil Painting, and each filter subtype may include one or more filter styles. Some editing operation types and editing operation modes may be similar to the CUT TO and filter modes, which will not be illustrated for example one by one here. Some editing operation types may be not divided into editing operation subtypes.

This step is aimed to determine the editing operation type used by at least one image material and the target editing operation mode corresponding to each editing operation type.

In an optional example, a mapping relationship between different content features in each particular dimension and the editing operation modes included in the editing operation type may be deployed in advance in the image processing apparatus. After the content feature set of the image materials in these particular dimensions is acquired, the corresponding mapping relationship is queried for each image material, thereby determining the target editing operation mode to be used for each editing operation type.

In step S202, the first content feature set may be output for a single first image material. Therefore, alternatively, the image processing apparatus may determine the editing strategy of the first image material based on the first content feature set corresponding to the first image material. The editing strategy of the first image material is used for indicating the target editing operation mode used for the first image material.

In step S202, the second content feature set may be output for the first image material group. Therefore, alternatively, the image processing apparatus may determine the editing strategy of the first image material group based on the second content feature set corresponding to the first image material group. The editing strategy of the first image material is used for indicating the target editing operation mode used for each image material included in the first image material group. In this case, it will be construed as that the target editing operation mode used for each image material included in the first image material group is the same.

The following description is made with a specific example.

Assuming that there are 3 image materials, the content feature set obtained by the feature analysis includes respective content features of the 3 image materials in the image theme dimension, the image emotion dimension, and the image salient feature dimension, and one content feature of the 3 image materials in the image character relationship dimension. Assuming that the editing strategy of the 3 image materials needs to be determined based on the content features, the editing strategy includes target editing operation modes corresponding to two editing operation types: CUT TO and filter.

I. CUT TO

A mapping relationship between the image scene dimension, the image emotion dimension, and the CUT TO may be deployed in advance in the image processing apparatus.

Exemplarily, the mapping relationship may be as shown in the following Table 1.

TABLE 1

| Image Scene | Image Emotion | CUT TO Mode |
| --- | --- | --- |
| Driving | Happy | Segmentation |
| Driving | Sad | Dissolve |
| Coffee shop | Happy | Shutter |
| Coffee shop | Sad | Vortex |

It is assumed that the content feature of the image material 1 in the image theme dimension is Driving, the content features of the image material 2 and the image material 3 in the image theme dimension are both Coffee shop, and the content features of the image material 1 to the image material 3 in the image emotion dimension are all Happy. As can be seen from the above Table 1, the target CUT TO mode used for the image material 1 is segmentation, and the target CUT TO mode used for the image material 2 and the image material 3 is shutter.

It should be noted that Table 1 merely exemplarily illustrates the mapping relationship between the content feature in the image scene dimension and the content feature in the image emotion dimension, and the CUT TO modes included in the editing operation type CUT TO. The content features in more dimensions may be used for determining the target CUT TO modes in practice, and the mapping relationship may be more complicated.

II. Filter

A mapping relationship between the image theme dimension, the image emotion dimension, and the filter mode may be deployed in advance in the image processing apparatus.

Exemplarily, the mapping relationship may be as shown in the following Table 2.

TABLE 2

| Image Scene | Image Emotion | Filter Mode |
| --- | --- | --- |
| Landscape | Happy | Clear sky |
| Landscape | Neutral | Midsummer |
| Landscape | Sad | Ancient city |
| Food | Happy | Warm food |
| Food | Neutral | Tasty |
| Food | Sad | Cold dish |

It is assumed that the content feature of the image material 1 in the image theme dimension is Landscape, the content features of the image material 2 and the image material 3 in the image theme dimension are both Food, the content features of the image material 1 and the image material 3 in the image emotion dimension are both Happy, and the content feature of the image material 2 in the image emotion dimension is Neutral. As can be seen from the above Table 2, the target filter mode to be used for the image material 1 is Clear sky, the target filter mode to be used for the image material 2 is Tasty, and the target filter mode to be used for the image material 3 is Warm food.

It should be noted that Table 2 merely exemplarily illustrates the mapping relationship between the content feature in the image theme dimension and the content feature in the image emotion dimension, and the filter modes included in the editing operation type filter. The content features in more dimensions may be used for determining the target filter modes in practice, and the mapping relationship may be more complicated.

In practice, the machine learning model for determining the editing strategy may be deployed in advance in the image processing apparatus. The content feature set is input to the machine learning model to acquire the editing strategy output by the machine learning model. The processing efficiency can be improved.

Exemplarily, referring continuously to FIG. 3, the machine learning model 303 for determining the editing strategy may include editing operation mode determination submodels 304 corresponding to different editing operation types, respectively. In use, the content feature set is input to the machine learning model 303. Each editing operation mode determination submodel 304 extracts the content feature in the desired particular dimension from the content feature set. Each editing operation mode determination submodel 304 then outputs the target editing operation mode to be used for the corresponding editing operation type based on the respective extracted content feature in the desired particular dimension.

In practice, there may be some cases, for example, when determining the target editing operation mode to be used for the editing operation type A, a reference needs to be made to the target editing operation mode to be used for the editing operation type B. Then, the editing operation mode determination submodels 304 may be connected according to practical requirements, so that some editing operation mode determination submodels 304 can obtain results output by other editing operation mode determination submodels 304.

For the first image material group, the implementation of acquiring the editing strategy of the first image material group is similar to the implementation of acquiring the editing strategy of the image material for a single image material, which will not be redundantly described here for the sake of brevity.

S204: editing the at least one image material into a multimedia resource according to the target editing operation mode.

In an optional example, an editing order of the at least one image material may be determined according to a preset rule; and the at least one image material may be synthesized to obtain the multimedia resource according to the determined editing order (e.g., an order of adding image materials by a user) and the target editing operation modes included in the editing strategy.

The preset rule may be but not limited to:

(1) An order of selecting image materials by a user.

(2) An order according to types of image materials.

For example, an order of putting a photo before an image and the image before a video clip, or an order of putting a video clip before a photo and the photo before an image may be used.

(3) An editing order of image materials determined according to time information (e.g., capturing time information) and/or geographical location information and the like carried by the image materials.

For example, a capturing time order of photos and video clips, or an editing order of image materials determined by classifying photos or video clips based on geographical location information of the photos or the video clips in combination with the number of photos and video clips of the same geographical location.

According to the image processing method provided by the present embodiment, a content feature set is acquired by performing feature analysis on at least one image material. Each content feature included in the content feature set is used for representing a content expressed by the image material in the corresponding particular dimension. Next, an editing strategy of the at least one image material is determined based on the content feature set and in accordance with a mapping relationship between different content features in the particular dimension and different operation modes included in different editing operation types. The at least one image material is synthesized according to respective target editing operation modes included in the editing strategy to obtain a multimedia resource with content continuity.

The image processing method provided by the embodiments of the present disclosure can specifically determine the target editing operation mode better matching the content expressed by the image material according to features of the image material, thereby further highlighting the storytelling of the obtained multimedia resource. In addition, by using the image processing method provided by the embodiments of the present disclosure, the problem of serious homogenization caused by synthesizing a multimedia resource using an editing template can be solved.

When editing at least one image material, a background music (i.e., an incidental music) may be added, rendering the obtained multimedia resource more interesting and more infectious, and the content to be expressed by the image material can be expressed better. How to add a matching background music to an image material and other editing modes will be described in detail with the embodiment shown in FIG. 4.

FIG. 4 is a flowchart of an image processing method provided by another embodiment of the present disclosure. As shown in FIG. 4, the image processing method in this embodiment include the following steps.

S401: acquiring at least one image material.

S402: performing feature analysis on the at least one image material to acquire a content feature set, in which the content feature set includes a content feature in at least one particular dimension, and the content feature is used for representing a content expressed by an image material in a corresponding particular dimension.

Steps S401 and S402 in this embodiment are similar to steps S201 and S202 in the embodiment shown in FIG. 2, respectively, and a reference may be made to the detailed description of the embodiment shown in FIG. 2, which will not be redundantly described here for the sake of brevity.

S403: acquiring a music content feature of a first target background music, in which the first target background music has an association relationship with a second target background music, and the second target background music and the at least one image material are synthesized into a multimedia resource.

In an optional example, the first target background music belongs to at least one piece of candidate background music, and the at least one piece of candidate background music is determined based on a content feature in a third target dimension in the content feature set. The third target dimension may be all or part of particular dimensions of the at least one particular dimension.

Exemplarily, it is assumed that the content features in the image theme dimension, the image scene dimension, and the image character relationship dimension need to be used when determining the at least one piece of candidate background music. After acquiring the content feature set through step S402, the image processing apparatus may determine the at least one piece of candidate background music for the image materials through automatic matching in a music library based on the content features in the image theme dimension, the content features in the image scene dimension, and the content features in the image character relationship dimension respectively according to all of the image materials. The music library may include at least one piece of music, and pieces of music in the music library correspond to music content features in different music dimensions. The "music dimensions" used herein may include but are not limited to one or more dimensions of a music style, a music emotion, a music theme, and a music character relationship. The above-mentioned music content features respectively corresponding to the music dimensions may be, but not limited to, obtained by analyzing one or more music features such as a beat, a lyric, and an audio effect of the music.

When performing matching in the music library, the image processing apparatus may match the content features of the image material in the image theme dimension, the image scene dimension, and the image character relationship dimension with the corresponding music content feature of a music in each music dimension, thereby determining one or more pieces of background music with a high fit with the image material in theme, scene, character relationship, and the like.

Alternatively, the background music with the highest fit may be directly determined as the first target background music; or a plurality of pieces of background music with highly ranked fits may be determined as candidate background music and one may be randomly selected from the candidate background music as the first target background music.

In another optional example, the first target background music may be specified by a user. Specifically, the image processing apparatus may display an audio material display interface according to an operation of adding an audio input by a user. Next, the image processing apparatus may receive a music selection operation (e.g., clicking on a label region of a music) input by the user in the audio material display interface and determine the music indicated by the music selection operation as the first target background music. The image processing apparatus further acquires the music content feature corresponding to the first target background music from the music library.

For the music content features corresponding to the music in the music library, a reference may be made to the foregoing description, which will not be redundantly described here.

S404: for a first editing operation type, acquiring a target editing operation mode corresponding to the first editing operation type based on a content feature in a first target dimension and a first preset mapping relationship.

The content feature in the first target dimension belongs to the content feature set. That is, the first target dimension belongs to the at least one particular dimension.

S405: for a second editing operation type, acquiring a target editing operation mode corresponding to the second editing operation type based on a content feature in a second target dimension, the music content feature corresponding to the first target background music, and a second preset mapping relationship.

The content feature in the second target dimension belongs to the content feature set. The first target background music has the association relationship with the second target background music, and the second target background music and the at least one image material are synthesized into the multimedia resource.

In this embodiment, the editing operation types may be classified into two categories, one being unrelated to the second target background music and the other one being related to the second target background music. The second target background music is a music for synthesizing the multimedia resource with the at least one image material.

When determining the target editing operation mode to be used for the editing operation type related to the second target background music, the influence of the second target background music needs to be considered. When determining the target editing operation mode to be used for the editing operation type unrelated to the second target background music, the influence of the second target background music does not need to be considered.

It should be noted that determining the target editing operation mode to be used for the editing operation type related to the second target background music may be implemented based on the second target background music. In this case, the first target background music and the second target background music may be the same music. Alternatively, it may also be implemented using the first target background music whose music content feature satisfies a preset similarity to the music content feature of the second target background music. In this case, the first target background music and the second target background music are different pieces of music. For example, assuming that the image processing apparatus determines at least one piece of candidate background music from the music library based on the content feature in the third target dimension, the candidate background music with the highest fit with the image material may be determined as the first target background music and the second target background music. Alternatively, when there are a plurality of pieces of candidate background music, the first target background music and the second target background music may be different pieces of music randomly determined from the plurality of pieces of candidate background music. Assuming that the image processing apparatus determines the first target background music according to the music selection operation input by the user, the first target background music may be determined as the second target background music.

The "first editing operation type" in S404 represents the editing operation type unrelated to the second target background music. For this editing operation type, the image processing apparatus pre-stores the corresponding first preset mapping relationship, and the first preset mapping relationship includes a mapping relationship between different content features corresponding to the first target dimension and various editing operation modes included in the first editing operation type.

The first target dimension includes all or part of particular dimensions of the at least one particular dimension.

The first preset mapping relationship corresponding to the first editing operation type is exemplarily as shown in Table 1 and Table 2. For the specific implementation of determining the target editing operation mode to be used for the first editing operation type based on the first preset mapping relationship, a reference may be made to the embodiment shown in FIG. 2, which will not be redundantly described here.

The "second editing operation type" in S405 represents the editing operation type related to the second target background music. For this editing operation type, the image processing apparatus pre-stores the corresponding second preset mapping relationship, and the second preset mapping relationship includes a mapping relationship between different content features corresponding to the second target dimension, different music content features, and various editing operation modes included in the second editing operation type.

The second target dimension includes all or part of particular dimensions of the at least one particular dimension.

Exemplarily, it is assumed that the second editing operation type is "Animation", where "Animation" is a change mode of an image material within a corresponding duration. For example, the animation may include: slightly scale up, slightly scale down, fade-out, slide to the left, slide to the right, etc. The target editing operation mode to be used for the editing operation type "Animation" needs to take into account the music emotion and music style dimensions of the second target background music. The following Table 3 exemplarily illustrates the second preset mapping relationship corresponding to the editing operation type "Animation".

TABLE 3

| Music Emotion | Music Style | Image Theme | Image Emotion | Animation Mode |
|---|---|---|---|---|
| Happy | Pop | Landscape | Neutral | Slightly scale up |
| Neutral | Pop | Landscape | Sad | Scale up |
| Sad | Pop | Landscape | Neutral | Fade-out |
| Happy | Electronic | Food | Happy | Scale down |
| Neutral | Electronic | Food | Neutral | Slightly scale down |

The implementation of determining the target editing operation mode (i.e., the target animation mode) to be used for the second editing operation type (Animation) based on the second preset mapping relationship is similar to the implementation of determining the target editing operation mode to be used for the first editing operation type based on the first preset mapping relationship.

It should be noted that Table 3 merely exemplarily illustrates the second preset mapping relationship corresponding to the second editing operation type. In practice, the second preset mapping relationship may use the content features in more dimensions, and the mapping relationship may be more complicated.

S406: editing the at least one image material and the second target background music into the multimedia resource according to the target editing operation mode.

The target editing operation mode in S406 includes the target editing operation mode corresponding to the first editing operation type and the target editing operation mode corresponding to the second editing operation type.

In an optional example, first, music points of the second target background music are determined according to the number of the image materials, and the second target background music is divided into a plurality of audio clips according to the music points. For example, assuming that there are 5 image materials, 4 music points need to be determined in the second target background music so that the second target background music can be divided into 5 music clips, and the editing order of the image materials corresponds to the order of the audio clips. The image materials and the second target background music are synthesized according to the correspondence between the editing order of the image materials and the order of the audio clips and by using respective determined target editing operation modes to obtain the multimedia resource.

That is, when synthesizing the multimedia resource, time positions of respective target editing operation modes in the multimedia resource may be determined according to the music points.

According to the image processing method provided by the present embodiment, feature analysis is performed on at least one image material to acquire a content feature set, in which each content feature included in the content feature set is used for representing a content expressed by the image material in one particular dimension. Next, music content features of a second target background music and a first target background music having a high similarity to the second target background music to be used for synthesizing a multimedia resource are determined based on the content feature set. An editing strategy of the at least one image material is determined in accordance with a mapping relationship between different content features in particular dimensions, different music content features, and editing operation modes of different editing operation types. The at least one image material and the second target background music are synthesized according to each target editing operation mode included in the editing strategy to obtain the multimedia resource. The image processing method provided by the embodiments of the present disclosure can specifically determine the target editing operation mode better matching the content expressed by the image material according to features of the image material, thereby further highlighting the storytelling of the obtained multimedia resource. In addition, when determining a target editing operation mode, the factor of the second target background music to be used for synthesizing the multimedia resource is considered such that the determined target editing operation mode matches not only the at least one image material but also the second target background music, allowing for better effect of the obtained multimedia resource.

In addition, by using the image processing method provided by the embodiments of the present disclosure, the problem of serious homogenization caused by synthesizing a multimedia resource using an editing template can be solved.

Figure 5:
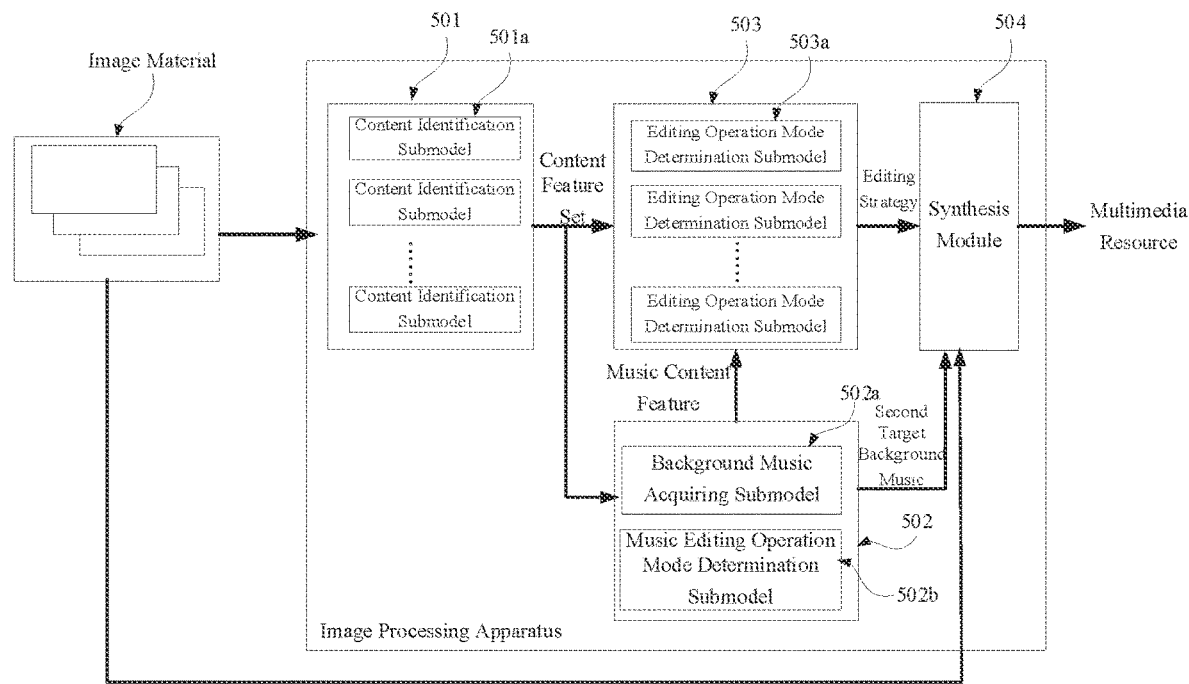
FIG. 5 is an architecture diagram of an image processing apparatus provided by another embodiment of the present disclosure.

Alternatively, the image processing method of the embodiment shown in FIG. 4 may be implemented by using the machine learning technology. As shown in FIG. 5, the following models may be deployed in advance in the image processing apparatus:

a machine learning model 501 configured to acquire a content feature set of image materials;

a machine learning model 502 configured to acquire a first target background music, a second target background music, a music content feature of the first target background music, and a music content feature of the second target background music, and determine an editing operation mode (music point, volume, audio effect, and the like) of the second target background music;

and an editing strategy determination model 503 configured to determine a target editing operation mode to be used for each editing operation type.

The machine learning model 501 is similar to the machine learning model 301 in the embodiment shown in FIG. 3, and a reference may be made to the detailed description of the embodiment shown in FIG. 3.

The machine learning model 502 may include a background music acquiring submodel 502a and a music editing operation mode determination submodel 502b.

Alternatively, the background music acquiring submodel 502a is capable of extracting content features in desired particular dimensions from the content feature set output by the machine learning model 501, determining at least one candidate background music from a music library based on the extracted content features in these dimensions, and acquiring a music content feature of a target background music in a music dimension.

Alternatively, the background music acquiring submodel 502a is further capable of determining the second target background music from the music library according to a music selection operation input by a user, and acquiring the music content feature of the second target background music.

In this case, the second target background music and the first target background music may be the same music.

The music editing operation mode determination submodel 502b is capable of determining a music editing operation mode (such as music point, volume, and audio effect) according to information such as music beats and the number of the image materials.

The editing strategy determination model 503 is configured to acquire a music content feature of the first target background music in a music dimension from the machine learning model 502 and acquire the content feature set of the image materials from the machine learning model 501. The editing strategy determination model 503 include editing operation mode determination submodels 503a corresponding to respective editing operation types, respectively.

For example, some editing operation types are related to the second target background music, e.g., an editing operation mode determination submodel 503a in FIG. 5. The editing operation mode determination submodel 503a corresponding to such an editing operation type is configured to extract a content feature in a desired particular dimension from the music content feature corresponding to the first target background music and the content feature set of the image materials, and outputs the target editing operation mode to be used for the editing operation type based on the extracted content feature.

Another editing operation types are unrelated to the second target background music, e.g., another editing operation mode determination submodel 503a in FIG. 5. The editing operation mode determination submodel 503a corresponding to such an editing operation type is configured to extract a label in a desired particular dimension from the content feature set of the image materials and outputs the target editing operation mode to be used for the editing operation type based on the extracted content feature.

The editing strategy determination model 503 inputs the determined target editing operation mode of each editing operation type to a synthesis module 504. The machine learning model 502 inputs the determined second target background music and the determined music editing operation mode of the second target background music to the synthesis module 504 such that the synthesis module 504 synthesize the at least one image material and the second target background music into the multimedia resource according to each target editing operation mode included in the editing strategy and the music editing operation mode of the second target background music.

It should be noted that the architecture of the image processing apparatus shown in FIG. 5 is merely an example. In practice, the architecture of the image processing apparatus may be different due to various factors such as different editing operation types, different editing operation modes of each editing operation type, and different image materials.

Exemplarily, the embodiments of the present disclosure further provide an image processing apparatus.

Figure 6:
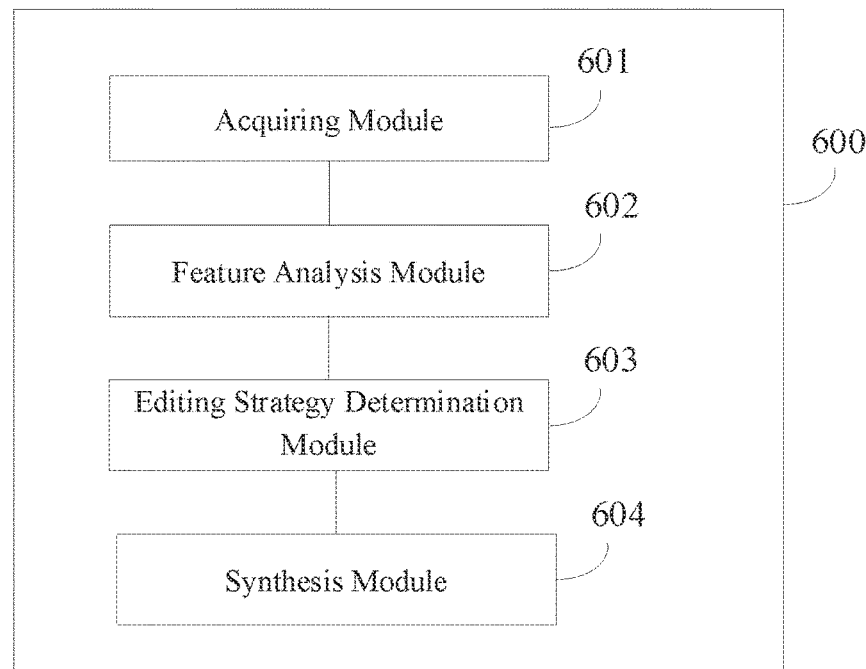
FIG. 6 is a schematic structural diagram of an image processing apparatus provided by an embodiment of the present disclosure.

FIG. 6 is a schematic structural diagram of an image processing apparatus provided by an embodiment of the present disclosure. As shown in FIG. 6, the image processing apparatus 600 provided by this embodiment includes:

an acquiring module 601 configured to acquire at least one image material;

a feature analysis module 602 configured to perform feature analysis on the at least one image material to acquire a content feature set, in which the content feature set includes a content feature in at least one particular dimension, and the content feature is used for representing a content expressed by an image material in a corresponding dimension;

an editing strategy determination module 603 configured to acquire an editing strategy of the at least one image material based on the content feature set, in which the editing strategy includes one or more target editing operation modes corresponding to one or more editing operation types, respectively;

and a synthesis module 604 configured to edit the at least one image material into a multimedia resource according to the target editing operation mode.

In an optional example, the editing strategy determination module 603 is specifically configured to, for a first editing operation type, acquire a target editing operation mode corresponding to the first editing operation type based on a content feature in a first target dimension and a first preset mapping relationship, in which the content feature in the first target dimension belongs to the content feature set, and the first preset mapping relationship includes a mapping relationship between different content features corresponding to the first target dimension and different operation modes included in the first editing operation type.

In an optional example, the editing strategy determination module 603 is specifically configured to: acquire a music content feature corresponding to a first target background music, in which the first target background music has an association relationship with a second target background music, and the second target background music is used to be edited into the multimedia resource together with the at least one image material; and for a second editing operation type, acquire a target editing operation mode corresponding to the second editing operation type based on a content feature in a second target dimension included in the content feature set, the music content feature corresponding to the first target background music, and a second preset mapping relationship, in which the second preset mapping relationship includes a mapping relationship between different content features corresponding to the second target dimension, different music content features, and different operation modes included in the second editing operation type.

In an optional example, the first target background music belongs to at least one piece of candidate background music, and the at least one piece of candidate background music is determined based on a content feature in a third target dimension included in the content feature set; or the first target background music is determined based on a music selection operation input by a user.

In an optional example, the synthesis module 604 is specifically configured to edit the at least one image material and the second target background music together into the multimedia resource according to the target editing operation mode.

A music content feature of the second target background music and the music content feature of the first target background music meet a preset similarity.

In an optional example, the feature analysis module 602 is specifically configured to perform feature analysis on a first image material included in the at least one image material to obtain a first content feature set corresponding to the first image material.

Correspondingly, the editing strategy determination module 603 is specifically configured to, for the first image material included in the at least one image material, acquire the editing strategy of the first image material based on the first content feature set corresponding to the first image material, in which the editing strategy of the first image material is used for indicating a target editing operation mode performed for the first image material.

In an optional example, the feature analysis module 602 is specifically configured to: group at least two image materials to obtain at least one image material group, in which the at least one image material group includes a first image material group, and the first image material group includes two or more image materials;

and perform feature analysis on the first image material group to obtain a second content feature set corresponding to the first image material group.

Correspondingly, editing strategy determination module 603 is specifically configured to, for the first image material group included in the at least one image material group, acquire an editing strategy of the first image material group based on the second content feature set corresponding to the first image material group, in which the editing strategy of the first image material group is used for indicating a target editing operation mode performed for each image material included in the first image material group.

In an optional example, the feature analysis includes one or more of salient feature analysis, image scene feature analysis, human face feature analysis, image theme feature analysis, and image emotion feature analysis.

In an optional example, the at least one particular dimension includes one or more of an image scene dimension, an image theme dimension, an image emotion dimension, an image character relationship dimension, an image salient feature dimension, and an image attribute dimension.

The image processing apparatus provided by this embodiment can be used to perform the technical solutions of any method embodiment described above, and may follow similar implementation principles and have similar technical effects, and a reference may be made to the description of the method embodiments, which will not be redundantly described herein for the sake of brevity.

Figure 7:
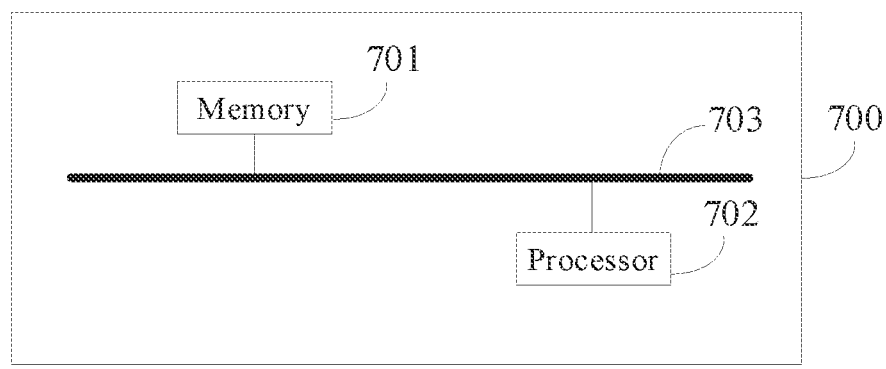
FIG. 7 is a schematic structural diagram of an electronic device provided by an embodiment of the present disclosure.

FIG. 7 is a schematic structural diagram of an electronic device provided by an embodiment of the present disclosure. With reference to FIG. 7, the electronic device 700 provided by this embodiment includes a memory 701 and a processor 702.

The memory 701 may be an independent physical unit and may be connected to the processor 702 through a bus 703. The memory 701 and the processor 702 may also be integrated together and may be implemented by hardware and the like.

The memory 701 is configured to store program instructions, and the processor 702 is configured to invoke the program instructions to perform the technical solutions of any method embodiment described above.

Alternatively, when part or all of the method in the above embodiments is implemented by software, the electronic device 700 may also include only the processor 702. The memory 701 for storing a program is located outside the electronic device 700. The processor 702 is connected to the memory through a circuit/wire and configured to read and execute the program stored in the memory.

The processor 702 may be a central processing unit (CPU), a network processor (NP), or a combination of the CPU and the NP.

The processor 702 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 701 may include a volatile memory, such as a random-access memory (RAM). The processor may also include a non-volatile memory, such as a flash memory, a hard disk drive (HDD), or a solid-state drive (SSD). The memory may also include a combination of such memories.

The embodiments of the present disclosure further provide a readable storage medium, the readable storage medium includes a computer program, and the computer program, when executed by at least one processor of an electronic device, implements the technical solutions of any method embodiment described above.

The embodiments of the present disclosure further provide a program product, the program product includes a computer program, and the computer program is stored in a readable storage medium. At least one processor of an electronic device may read the computer program from the readable storage medium, and the at least one processor executes the computer program to cause the electronic device to implement the technical solutions of any method embodiment described above.

It should be noted that in the present disclosure, relational terms such as "first," "second," etc. are only used to distinguish one entity or operation from another entity or operation, and do not necessarily require or imply the existence of any actual relationship or order between these entities or operations. Furthermore, the terms "comprise," "comprising," "include," "including," etc., or any other variant thereof are intended to cover non-exclusive inclusion, such that a process, method, article or device comprising a set of elements includes not only those elements, but also other elements not expressly listed, or other elements not expressly listed for the purpose of such a process, method, article or device, or elements that are inherent to such process, method, article or device. Without further limitation, an element defined by the phrase "includes a . . . " does not preclude the existence of additional identical elements in the process, method, article or device that includes the element.

The above descriptions are only specific embodiments of the present disclosure, enabling those skilled in the art to understand or implement the present disclosure. Various modifications to these embodiments will be readily apparent to those skilled in the art, and the generic principles defined herein may be practiced in other embodiments without departing from the spirit or scope of the present disclosure. Therefore, the present disclosure is not to be limited to the embodiments described herein but is to be accorded the widest scope consistent with the principles and novel features disclosed herein.

What is claimed is:

1. An image processing method, comprising:
on a processor for performing the following steps:
acquiring at least one image material;

performing feature analysis on the at least one image material to acquire a content feature set, wherein the content feature set comprises a content feature in at least one particular dimension, and the content feature is used for representing a content expressed by an image material in a corresponding particular dimension;

acquiring an editing strategy of the at least one image material based on the content feature set, wherein the editing strategy comprises one or more target editing operation modes corresponding to one or more editing operation types, respectively; and editing the at least one image material into a multimedia resource according to the one or more target editing operation modes.

2. The image processing method according to claim 1, wherein acquiring an editing strategy of the at least one image material based on the content feature set, comprises:

for a first editing operation type, acquiring a target editing operation mode corresponding to the first editing operation type based on a content feature in a first target dimension and a first preset mapping relationship, wherein the content feature in the first target dimension belongs to the content feature set; and the first preset mapping relationship comprises a mapping relationship between different content features corresponding to the first target dimension and different operation modes comprised in the first editing operation type.

3. The image processing method according to claim 2, wherein the feature analysis comprises:

one or more of salient feature analysis, image scene feature analysis, human face feature analysis, image theme feature analysis, and image emotion feature analysis.

4. The image processing method according to claim 2, wherein the at least one particular dimension comprises:

one or more of an image scene dimension, an image theme dimension, an image emotion dimension, an image character relationship dimension, an image salient feature dimension, and an image attribute dimension.

5. An electronic device, comprising a memory, a processor, and a computer program, wherein the memory is configured to store the computer program; and the processor is configured to execute the computer program to implement the image processing method according to claim 2.

6. A readable storage medium, comprising a computer program, wherein the computer program, when executed by at least one processor of an electronic device, implements the image processing method according to claim 2.

7. The image processing method according to claim 1, wherein acquiring an editing strategy of the at least one image material based on the content feature set, comprises:

acquiring a music content feature corresponding to a first target background music, wherein the first target background music has an association relationship with a second target background music, and the second target background music is used to be edited into the multimedia resource together with the at least one image material; and for a second editing operation type, acquiring a target editing operation mode corresponding to the second editing operation type based on a content feature in a second target dimension comprised in the content feature set, the music content feature corresponding to the first target background music, and a second preset mapping relationship, wherein the second preset mapping relationship comprises a mapping relationship between different content features corresponding to the second target dimension, different music content features, and different operation modes comprised in the second editing operation type.

8. The image processing method according to claim 7, wherein the first target background music belongs to at least one piece of candidate background music, and the at least one piece of candidate background music is determined based on a content feature in a third target dimension comprised in the content feature set; or the first target background music is determined based on a music selection operation input by a user.

9. The image processing method according to claim 8, wherein the feature analysis comprises:

one or more of salient feature analysis, image scene feature analysis, human face feature analysis, image theme feature analysis, and image emotion feature analysis.

10. The image processing method according to claim 8, wherein the at least one particular dimension comprises:

one or more of an image scene dimension, an image theme dimension, an image emotion dimension, an image character relationship dimension, an image salient feature dimension, and an image attribute dimension.

11. The image processing method according to claim 7, wherein editing the at least one image material into a multimedia resource according to the one or more target editing operation modes, comprises:

editing the at least one image material and the second target background music together into the multimedia resource according to the one or more target editing operation modes, wherein a music content feature of the second target background music and the music content feature of the first target background music meet a preset similarity.

12. The image processing method according to claim 7, wherein the feature analysis comprises:

one or more of salient feature analysis, image scene feature analysis, human face feature analysis, image theme feature analysis, and image emotion feature analysis.

13. The image processing method according to claim 7, wherein the at least one particular dimension comprises:

one or more of an image scene dimension, an image theme dimension, an image emotion dimension, an image character relationship dimension, an image salient feature dimension, and an image attribute dimension.

14. An electronic device, comprising a memory, a processor, and a computer program, wherein the memory is configured to store the computer program; and the processor is configured to execute the computer program to implement the image processing method according to claim 3.

15. The image processing method according to claim 1, wherein performing feature analysis on the at least one image material to acquire a content feature set, comprises:

performing feature analysis on a first image material comprised in the at least one image material to obtain a first content feature set corresponding to the first image material; and acquiring an editing strategy of the at least one image material based on the content feature set, comprises:

for the first image material comprised in the at least one image material, acquiring the editing strategy of the first image material based on the first content feature set corresponding to the first image material, wherein the editing strategy of the first image material is used for indicating a target editing operation mode performed for the first image material.

16. The image processing method according to claim 1, wherein performing feature analysis on the at least one image material to acquire a content feature set, comprises:

grouping at least two image materials to obtain at least one image material group, wherein the at least one image material group comprises a first image material group, and the first image material group comprises two or more image materials; and performing feature analysis on the first image material group to obtain a second content feature set corresponding to the first image material group; and acquiring an editing strategy of the at least one image material based on the content feature set, comprises:

for the first image material group comprised in the at least one image material group, acquiring an editing strategy of the first image material group based on the second content feature set corresponding to the first image material group, wherein the editing strategy of the first image material group is used for indicating a target editing operation mode performed for each image material comprised in the first image material group.

17. The image processing method according to claim 1, wherein the feature analysis comprises:

one or more of salient feature analysis, image scene feature analysis, human face feature analysis, image theme feature analysis, and image emotion feature analysis.

18. The image processing method according to claim 1, wherein the at least one particular dimension comprises:

one or more of an image scene dimension, an image theme dimension, an image emotion dimension, an image character relationship dimension, an image salient feature dimension, and an image attribute dimension.

19. An electronic device, comprising a memory, a processor, and a computer program, wherein the memory is configured to store the computer program; and the processor is configured to execute the computer program to implement the image processing method according to claim 1.

20. A readable storage medium, comprising a computer program, wherein the computer program, when executed by at least one processor of an electronic device, implements the image processing method according to claim 1.

* * * * *